United States Patent [19]

Bauer et al.

[11] Patent Number: 4,564,883

[45] Date of Patent: Jan. 14, 1986

[54] CONTROL UNIT FOR A MOTOR VEHICLE WHICH CAN BE ACCOMMODATED IN A TRIM COMPONENT

[75] Inventors: Wilhelm Bauer, Sindelfingen; Josef Berger, Wolfschlugen; Horst Dahm, Ostelsheim; Hans Klemm, Sindelfingen; Peter Schmid, Schorndorf; Horst Seidl, Boblingen; Dietmar Walter, Winnenden, all of Fed. Rep. of Germany

[73] Assignee: Daimler-Benz Aktiengesellschaft, Fed. Rep. of Germany

[21] Appl. No.: 439,021

[22] Filed: Nov. 4, 1982

[30] Foreign Application Priority Data

Nov. 5, 1981 [DE] Fed. Rep. of Germany ....... 3143888

[51] Int. Cl.$^4$ .............................................. H02B 1/04
[52] U.S. Cl. ....................................... 361/334; 180/90
[58] Field of Search ............... 361/334, 346, 353, 356, 361/358, 363; 248/27.1, 27.3; 180/90; 296/70; 200/296; 174/55, 56 R

[56] References Cited

U.S. PATENT DOCUMENTS

| | | | |
|---|---|---|---|
| 1,398,373 | 11/1921 | Graesser et al. | 248/27.3 |
| 1,692,449 | 11/1928 | Keeney | 180/90 X |
| 1,744,008 | 1/1930 | McKinley | 180/90 |
| 1,823,868 | 7/1931 | Zubaty | 180/90 X |
| 3,532,938 | 10/1970 | Holman et al. | 361/363 X |
| 3,689,013 | 9/1972 | Neugebauer | 180/90 |

FOREIGN PATENT DOCUMENTS

| | | | |
|---|---|---|---|
| 2742111 | 3/1979 | Fed. Rep. of Germany | 248/27.1 |
| 47903 | 3/1979 | Netherlands | 248/27.1 |

Primary Examiner—A. D. Pellinen
Assistant Examiner—Gregory D. Thompson
Attorney, Agent, or Firm—Craig and Burns

[57] ABSTRACT

The invention relates to a control unit which comprises one or more switches and is capable of integration into a trim component installed inside the passenger compartment of a motor vehicle. The control unit is designed in such a manner that, after fitting the trim which accommodates it, a baseplate can be fixed to the trim, the baseplate accommodating the bases of all the control elements intended for the control unit.

5 Claims, 4 Drawing Figures

CONTROL UNIT FOR A MOTOR VEHICLE WHICH CAN BE ACCOMMODATED IN A TRIM COMPONENT

BACKGROUND OF THE INVENTION

The invention relates to a control unit which comprises one or more switches, capable of being accommodated in an aperture in a trim component installed inside the passenger compartment of a motor vehicle, and which is capable of being attached, in a manner permitting removal, to bases which are connected to electrical leads.

It is known to install control units, in the passenger compartments of motor vehicles, in a manner whereby they are integrated into trim components. This installation is effected by clipping the switch itself, or its base, into the corresponding trim component, or by some similar attachment method. With this type of installation, it is necessary to make the lead connections to the control unit, outside the trim, either during initial assembly, or whenever a switch is replaced.

This requirement necessitates that the incoming leads be overlength, by quite a considerable margin.

It has now been found, when several switches are arranged on a small area, that the profusion of cables associated therewith causes, as a result of the restricted space available to the designer, backward-displacement forces which act in the opposite direction to the direction in which installation is carried out, thereby rendering the installation of the switch more difficult and, in some cases, even pushing the switch out of its installation position.

Accordingly, it is an object of the invention to produce a new and improved control unit.

Another object of the invention is a control unit capable of integration into a trim component installed inside a passenger compartment of a motor vehicle.

Another object of the invention is the elimination of disadvantages obtained with prior art devices in order to provide an arrangement which is easy to install and which requires only minimal cable-lengths.

Another object of the invention is the production of a control unit wich comprises one or more switches, and is capable of being accommodated in an aperture in a trim component installed inside the passenger compartment of a motor vehicle, and which is capable of being attached, in a manner permitting removal, to bases which are connected to electrical leads, wherein the bases are arranged on a common baseplate and the baseplate can be connected to the trim component by clipping in, or by a similar method, in such a manner that the baseplate can be shifted in the plane defined by its outline and can be fixed only by means of a masking plate which is designed as a cover panel and is configured to be capable of connection to a baseplate in a manner stabilizing its position.

Another object of the invention is a control unit wherein a masking plate possesses centering sleeves which engage, during the assembly operation, associated centering pins which project from the baseplate.

A further object of the invention is a control unit having a masking plate with centering sleeves which engage centering pins which project from the baseplate during the assembly operation wherein the baseplate possesses at least one hand-hold.

A BRIEF DESCRIPTION OF THE DRAWINGS

The forging objects, features, and advantages of the present invention will become more apparent from the following description when taken in connection with the accompanying drawings which show, for the purposes of illustration only, one embodiment in accordance with the present invention, and wherein:

FIG. 1 shows a plan view of a central console of a motor vehicle, this console being provided with a control unit according to the invention, FIG. 2 shows a vertical section through the upper portion of this central console, corresponding to the line II—II in FIG. 1, FIG. 3 shows a detail III from FIG. 2, from the zone of contact between the switch 3 and the masking plate 2, and FIG. 4 shows a detail IV from FIG. 2 of the region in which the baseplate 16 is attached to the console 1 and the masking plate 2.

DETAILED DESCRIPTION OF THE DRAWINGS

Figure 1:
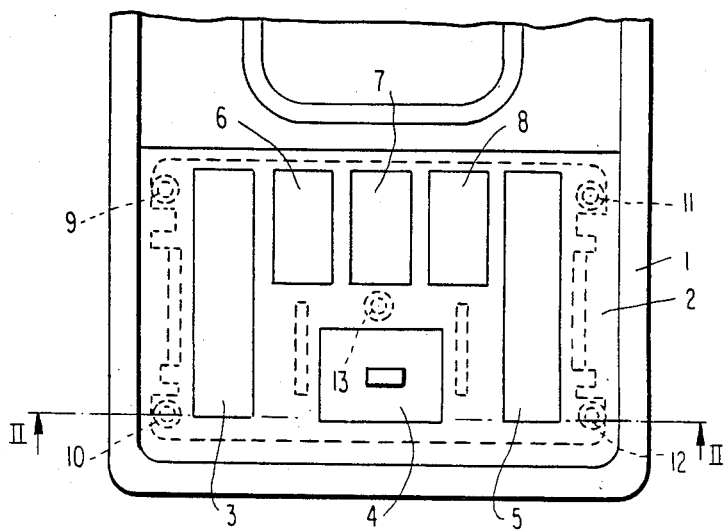

In the figures, like reference numerals represent like features, and the contours of a central console or trim component 1 of a motor vehicle, which is not represented, are merely indicated in FIG. 1. A masking plate 2 possesses apertures for switches 3, 4, 5, 6, 7, 8 and is provided, on its rear surface, with centering sleeves 9, 10, 11, 12, 13.

Figure 2:
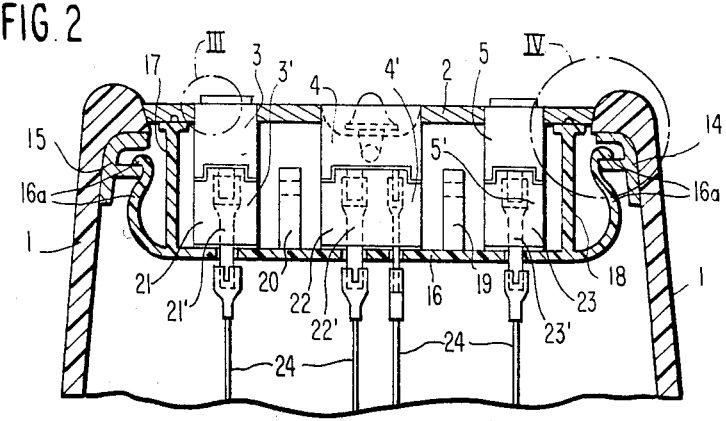

FIG. 2 shows, in a sectional representation, the upper portion of the central console, with the control unit according to the invention in the installed condition. A parallel guide 14, 15 is rigidly connected to the central console 1, a baseplate 16 being suspended in this parallel guide, by means of integrally moulded clips at 16a. Further constituents which are integrally moulded on the baseplate 16 are the centering pins 17, 18 and the handholds 19, 20. A plurality of bases 21, 22, 23 are attached to the baseplate 16, these bases possessing, on their underside, known devices 21', 22', 23' to those skilled in the art which enable cable connections 24 to be made, and are capable, on their upper surface, of being plug fitted, see 3+, 4', 5', for example to the switches 3, 4, 5, 6, 7, 8.

Figure 3:
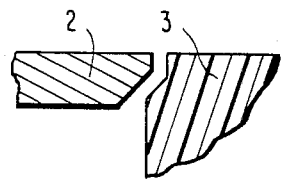

In FIG. 3, it becomes clear that both the edge of the aperture in the masking plate 2 which receives the switch 3, and the upper portion of the switch 3, exhibit chamfers in their contact zone which run in the same direction. These chamfers enable the masking plate 2 to be installed without any difficulty, since the switch 3 is automatically centered as the masking plate 2 is placed in position and pressed down.

Figure 4:
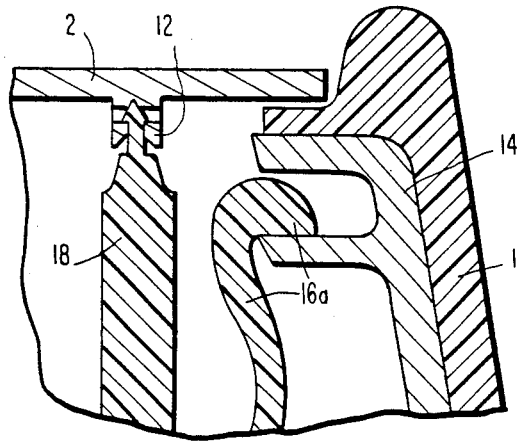

FIG. 4 shows, in detail, the region in which the baseplate 16 is attached to the console 1, and to the masking plate 2. Here, it becomes evident that, after the baseplate 16 has been clipped into the parallel guide 14, this baseplate 16 can still be shifted, but only in the horizontal plane. Its final installation position is established only by connecting the centering sleeve 12 to the centering pin 18, this sleeve being moulded onto the underside of the masking plate 2. At the same time, the installation position of the masking plate 2 itself is defined by the integrally moulded projection of the inner edge of the console 1.

The installation of the control unit proceeds as follows:

The bases 21, 22, 23, which are attached to the baseplate 16, are already provided with their cable connections. Such connections may take any of a variety of forms known to those skilled in the art of which plug, jack and spade connections may be considered as exemplary. A cable may pass through the baseplate 16 to the space below encompassed by console 1 or, alternatively, such a cable may pass around the edge of baseplate 16 at a point which may be considered to be below the surface of the page as shown in FIG. 2. The central console 1 can now be installed. Following this operation, the assembly worker reaches through the aperture provided for the control unit in the central console 1, grips the baseplate 16 at the handholds 19, 20, and lifts this baseplate until the clips, which are integrally moulded on it, clip into a parallel guide 14, 15 which is rigidly connected to the central console 1. At this stage, the baseplate 16 can still be shifted, but only in its horizontal plane. It will be apparent from a consideration of FIG. 4 that some space is provided between the baseplate 16 and the parallel guide 14 for sliding the baseplate 16 in a horizontal plane and, alternatively, flexing of the baseplate at the portion thereof between centering pins 17 and 18 and the parallel guides 14 and 15. The switches 3, 4, 5 are then attached to their respective bases 21, 22, 23. To complete the installation, the masking plate 2 is fitted, this plate being provided with openings through which the switches 3, 4, 5, 6, 7, 8 project. The connection of the masking plate 2 to the baseplate 16 is effected by means of five centering pins 17, 18, which are integrally moulded on the surface of the baseplate 16 and which engage five associated centering sleeves 9, 10, 11, 12, 13, which are present on the underside of the masking plate 2. The baseplate 16 is fixed in its installation position by the positive engagement of the outer edge of the masking plate 2 with the inner edge of the central console 1.

While we have shown and described only one embodiment in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by the scope of the appended claims.

We claim:

1. A control unit removably attached in an aperture to a trim component, the trim component having parallel guide means and installed inside a passenger compartment of a motor vehicle, the control unit having at least one switch and at least one base for receiving an electrical signal comprising:
   a baseplate receiving said at least one base, the baseplate having clip means attaching the baseplate to the trim component in such a manner that the baseplate can be shifted in the plane defined by the outline of the baseplate,
   a masking plate means forming a cover panel and engaging the baseplate for stabilizing the position of the baseplate positionally with respect to the trim component.

2. A control unit removably attached in an aperture to a trim component, the trim component having parallel guide means and installed inside a passenger compartment of a motor vehicle, the control unit having at least one switch and at least one base for receiving an electrical signal comprising:
   a baseplate receiving said at least one base, the baseplate having clip means attaching the baseplate to the trim component in such a manner that the baseplate can be shifted in the plane defined by the outline of the baseplate,
   a masking plate means forming a cover panel and engaging the baseplate for stabilizing the position of the baseplate positionally with respect to the trim component,
   the masking plate means comprising centering sleeves engaging centering pins projecting from the baseplate.

3. A control unit according to claim 2, wherein the baseplate comprises:
   at least one handhold.

4. A control unit composed of more than one switch, said unit being received by an opening in a console disposed on the inside of a motor vehicle, the switches being connected to a base means for receiving an electrical signal characterized by the fact that the base means are mounted on a common baseplate, the baseplate being shiftable in a plane defined by the outline of the baseplate, by means of shaped clips which engage guides disposed laterally on the console, said baseplate being stabilized with respect to the console by a masking plate positioning the switches laterally with respect to the console and the masking plate being mounted to the baseplate.

5. A control unit removably attached in an aperture to a trim component, the trim component having parallel guide means and installed inside a passenger compartment of a motor vehicle, the control unit having at least one switch and at least one base for receiving an electrical signal comprising:
   a baseplate receiving said at least one base, the baseplate having clip means attaching the baseplate to the trim component in such a manner that the baseplate can be shifted in the plate defined by the outline of the baseplate,
   a masking plate means forming a cover panel and engaging the baseplate for stabilizing the position of the baseplate positionally with respect to the trim component and wherein
   the baseplate comprises at least one handhold.

* * * * *